United States Patent [19]
Hama

[11] Patent Number: 5,712,719
[45] Date of Patent: Jan. 27, 1998

[54] OPTICAL SCANNING DEVICE

[75] Inventor: Yoshihiro Hama, Tokyo, Japan

[73] Assignee: Asahi Kogaku Kogyo Kabushiki Kaisha, Tokyo, Japan

[21] Appl. No.: 547,466

[22] Filed: Oct. 24, 1995

[30] Foreign Application Priority Data

Oct. 27, 1994 [JP] Japan .................... 6-287385

[51] Int. Cl.$^6$ ................................. G02B 26/08
[52] U.S. Cl. ................. 359/207; 359/208; 359/216; 250/236
[58] Field of Search ................... 359/205–208, 359/216–219; 347/256–261, 250; 250/234–236

[56] References Cited

U.S. PATENT DOCUMENTS

| 5,080,457 | 1/1992 | Fetzer et al. ................. 359/217 |
| 5,130,840 | 7/1992 | Iima et al. . |
| 5,134,513 | 7/1992 | Morimoto . |
| 5,194,982 | 3/1993 | Morimoto . |
| 5,218,461 | 6/1993 | Aoyama et al. . |
| 5,299,050 | 3/1994 | Morimoto et al. . |
| 5,301,060 | 4/1994 | Niikawa et al. ................. 359/218 |
| 5,408,095 | 4/1995 | Atsuumi et al. . |
| 5,452,119 | 9/1995 | Morimoto et al. . |
| 5,621,562 | 4/1997 | Hama ................. 359/208 |

FOREIGN PATENT DOCUMENTS

6-265810  9/1994  Japan .

*Primary Examiner*—James Phan
*Attorney, Agent, or Firm*—Greenblum & Bernstein, P.L.C.

[57] ABSTRACT

A polygonal mirror used to scan a laser flux is inclined with respect to a mounting surface of a housing of the optical scanning device, in such a manner that the beam incident to the polygonal mirror is parallel to the mounting surface, enabling the reduction of the housing in the sub-scanning direction.

20 Claims, 5 Drawing Sheets

PRIOR ART

OPTICAL SCANNING DEVICE

BACKGROUND OF THE INVENTION

The present invention relates to reflection type optical scanners used primarily in laser beam printers. Recently, compact laser beam printers and compact optical scanning devices for use therein have come into increased demand. A conventional reflection type optical scanning device is disclosed in Japanese Patent Provisional Publication HEI 6-265810. An optical scanning device is disclosed therein, in which a laser beam is generated at a laser source pointed at a polygonal mirror and is reflected back by the polygonal mirror (towards the laser source and angled upwards) to a cylindrical mirror. The laser beam is then reflected back again (towards the polygonal mirror and again angled upward) to a toric lens and optical path bending mirror. The beam is reflected by the optical path bending mirror toward an imaging drum. In this case, "up" is a sub-scanning direction.

However, in the sub-scanning direction of the optical scanning device as disclosed therein, various optical elements are separated from each other by a considerable distance. Consequently, it is difficult to reduce the thickness of the conventional optical scanning device in the sub-scanning direction.

SUMMARY OF THE INVENTION

It is therefore an object of the present invention to provide an improved reflection type optical scanning device that is smaller than those of the prior art, in the general sub-scanning direction.

In order to achieve the objects of the present invention, an optical scanning device includes a housing having a flat mounting surface for mounting the optical scanning device, the mounting surface defining a mounting plane; A laser supply, is supported by the housing, for supplying a laser flux. A polygonal mirror is provided for scanning the laser flux supplied by the laser supply. The polygonal mirror is rotatably supported in the housing about a rotary axis inclined with respect to the flat mounting surface by a predetermined angle, the predetermined angle defining an incident optical path substantially parallel to the mounting surface along which the laser flux is supplied by the laser supply. A scanning optical path is defined for separating the scanning laser flux by a first separation angle $\theta_1$ in a sub-scanning direction away from the mounting plane. A curved surface mirror reflects the laser flux scanned by the polygonal mirror, and for converges the laser flux scanned by the polygonal mirror in a main scanning direction. The reflected scanning laser flux is separated from the scanning laser flux by a second separation angle $\theta_2$ in the sub-scanning direction. An anamorphic lens converges the reflected scanning laser flux in the sub-scanning direction.

In this manner, the inclination of the polygonal mirror relative to the mounting surface allows the incident and exit paths to be defined so that the incident path is substantially parallel to the mounting surface, while maintaining the exit path. Especially when the mounting surface is an outer surface of the housing, the size of the housing in the sub-scanning direction is considerably reduced.

According to one preferred embodiment, the laser supply includes a laser source supported by the housing, for emitting a laser beam substantially parallel to the mounting surface, and being positioned between the curved mirror and the polygonal mirror. A first flat mirror is supported by the housing, for receiving and redirecting the laser beam from the laser source in a direction substantially parallel to the mounting surface.

Since the laser supply consists of a laser source and redirecting mirror, both of which are situated substantially parallel to the mounting surface, the optical path within the laser supply may be bent, and the housing may be further reduced in the sub-scanning direction. With this arrangement, the laser source may be placed to one side, while an optical path followed within the laser supply is as much as halved in the direction incident to the polygonal mirror (thus halving the contribution to the size in the sub-scanning direction).

Preferably, the first separation angle $\theta_1$ defines a minimum distance in the sub-scanning direction between the laser supply and the curved surface mirror sufficient to prevent interference with the outgoing beam path. The second separation angle $\theta_2$ defines a minimum distance in the sub-scanning direction between the polygonal mirror and the anamorphic lens sufficient to prevent transmission of vibration from the polygonal mirror to the anamorphic lens.

Accordingly, even though the distances in the sub-scanning direction are minimized, the physical and operating constraints are still observed.

In another preferred embodiment, the anamorphic lens is formed to be of substantially equal height in the sub-scanning direction on either side of a scanning locus of the reflected scanning laser flux on the anamorphic lens, and an optical axis of the anamorphic lens is displaced in the sub-scanning direction toward the polygonal mirror. The displacement of the optical axis of the anamorphic lens enables the removal of skew distortion, while the formation of the lens to be of substantially equal height on either side of the scanning locus of the laser flux enables the unused portion (in the sub-scanning direction) of the anamorphic lens to be removed (that is, only useful portions, not symmetric portions, are formed). Accordingly, the size of the anamorphic lens and hence the entire optical scanning device may be reduced in the sub-scanning direction.

DESCRIPTION OF THE EMBODIMENTS

The device of the embodiment is an optical scanning device to be used in a laser beam printer.

The printer, in which the embodiment is incorporated operates generally by scanning an electrostatic latent image onto a photoconductive drum 18 by means of a laser beam modulated by an input signal.

Hereinafter, in the context of this specification, the term "main scanning direction" is defined as the direction in which the laser beam deflected by a polygonal mirror 14 scans, (i.e., if projected back along the optical path, in a direction that is ultimately parallel to the rotational axis of the photoconductive drum 18 when the beam reaches the drum 18). Furthermore, the "sub-scanning direction" is defined as perpendicular to the main scanning direction, with reference to the optical path of the main scanning beam (i.e., if projected back along the optical path, in a direction that is ultimately tangent to the cylindrical surface of the drum 18 when the beam reaches the drum 18).

Figure 1:
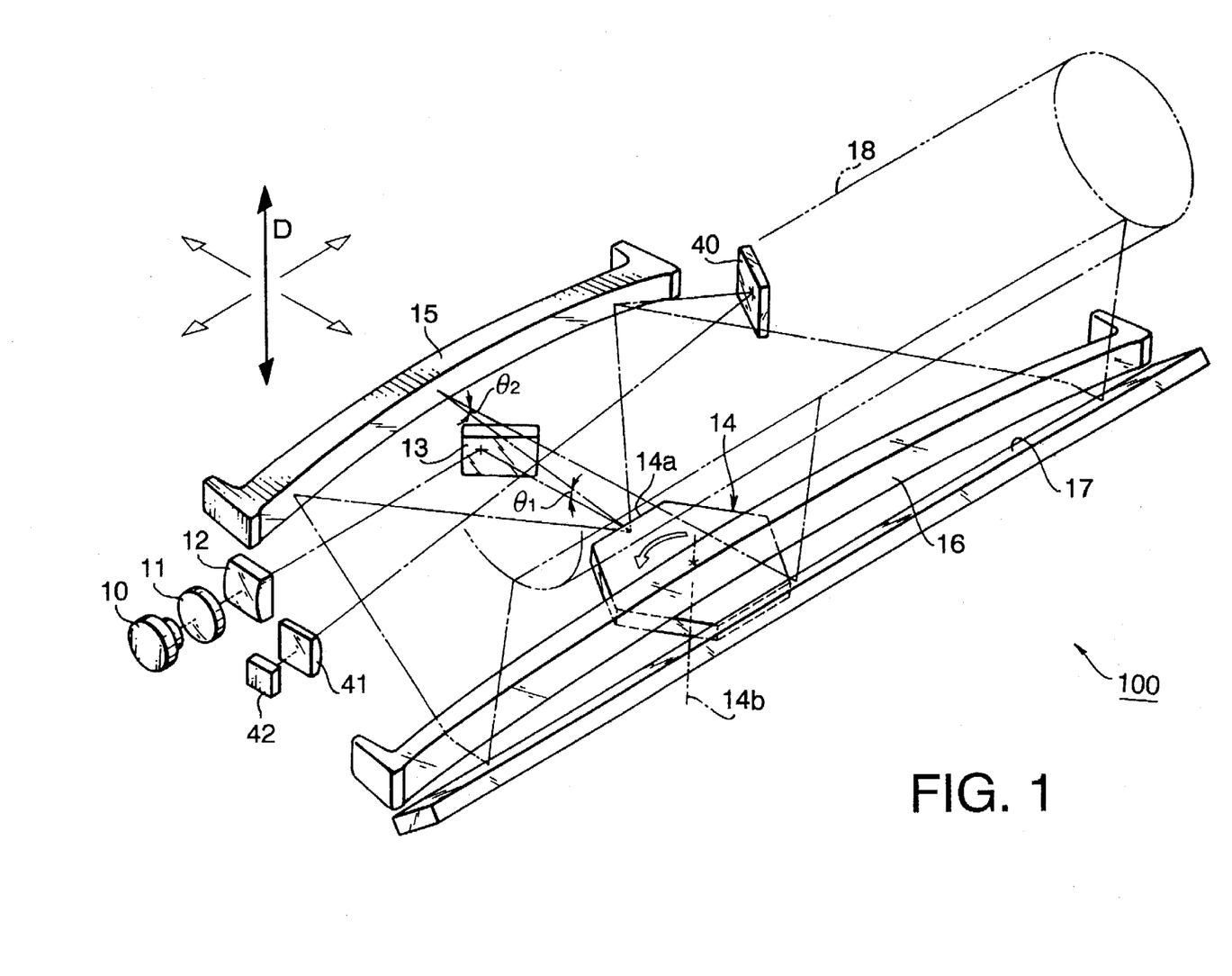
FIG. 1 is a simplified perspective view of an optical system as applied in the embodiment of the invention.

Thus, for all of the optical elements in the system, except an optical path bending mirror 17, the sub-scanning direction is generally in the depth direction (general direction D in FIG. 1) of the system as depicted in FIG. 1. This is hereinafter referred to as the "sub-scanning direction".

The laser beam at the surface of the photoconductive drum is the reference point for the optical power of the optical elements. That is, the power in the main scanning direction means the power contributing to converge or disperse in the main scanning direction at the drum. The power in the sub-scanning direction means the power which contributes to converge or disperse the laser beam in the sub-scanning direction at the drum.

As shown in FIG. 1, an embodiment of a optical scanning device 100 according to the present invention is arranged such that diverging light generated from a semiconductor laser 10 (laser source) is collimated by means of a collimator 11. The collimated beam then passes through a cylindrical lens 12, which converges the beam in the sub-scanning direction only. The converged beam is then reflected, at a substantially right angle, towards a polygonal mirror 14 by a flat mirror 13.

The polygonal mirror is rotatable at a high speed, turning six reflecting surfaces 14a across the beam, thereby scanning the laser beam in the main scanning direction. The scanning beam is deflected up in the sub-scanning direction by the polygonal mirror 14 at a first separation angle $\theta_1$, and is subsequently again deflected up in the general sub-scanning direction by a curved surface mirror 15 (having positive power in the main scanning direction), and directed to an anamorphic lens 16 above the polygonal mirror 14. The anamorphic lens primarily has power in the sub-scanning direction. The beam is then redirected by an optical path bending mirror 17, and illuminates the photoconductive drum 18 above the optical scanning device 100, scanning in the main scanning direction.

Thus, the laser beam forms an image, once converged in the sub-scanning direction by the cylindrical lens 12, on each reflecting surface 14a of the polygonal mirror 14. The beam then again forms an image on the photoconductive drum 18, after again being converged by means of the optical power of the anamorphic lens 16 in the sub-scanning direction. This structure prevents displacement of the scanning beam on the photoconductive drum 18 from tilting error of the reflecting surface 14a.

The flat mirror 13 reflects the laser beam from the cylindrical lens 12 at a substantially right angle towards the rotary axis 14b of the polygonal mirror 14. The laser beam is directed towards the rotary axis 14b of the polygonal mirror 14 to increase the angular range through which scanning is possible. Thus, given any required size of polygonal mirror 14, the scanning range is larger. Conversely, given any required scanning range, the size of the polygonal mirror 14 can be reduced. Furthermore, given this arrangement, optical field curvature occurs symmetrically about the optical axis, so that a field curvature correction is easily accomplished.

Hereafter, to facilitate explanation, a plane containing the optical axis of the laser beam generated by the semiconductor laser 10, and containing the optical axis of the laser beam reflected by the flat mirror 13 (and incident upon the polygonal mirror 14), is designated as a laser supply plane.

In this embodiment, the polygonal mirror 14 is a flattened hexagonal prism shape; the six lateral faces are reflecting surfaces, and the polygonal mirror 14 is fashioned from metal. The polygonal mirror 14 is rotated by a motor (not shown) in FIG. 1 about a rotational axis 14b to scan the laser beam reflected therefrom. The rotational axis 14b of the polygonal mirror 14 is inclined at an angle of ½ of a first separation angle $\theta_1$ from a normal line of the laser supply plane. The inclination of the axis 14b of the polygonal mirror 14 deflects the laser beam at a first separation angle $\theta_1$ from the laser supply plane, in the sub-scanning direction.

The first separation angle $\theta_1$ is set to be as little as possible, but having sufficient separation from the laser supply plane (containing the flat mirror 13 and beam therefrom) to prevent interference with the flat mirror 13 with the scanning beam. Thus, the curved surface mirror 15 is placed to intercept the incoming beam at first separation angle $\theta_1$ from the polygonal mirror 14, behind the flat mirror 13 (with reference to the path of the incoming beam).

A concave mirror is employed as the curved surface mirror 15 in this embodiment. The curved surface mirror 15 is inclined (toward the polygonal mirror 14) by an angle of substantially $(2\theta_1-\theta_2)/2$ from a normal line of the laser supply plane. The inclination of curved surface mirror 15 directs the scanning beam at a second separation angle $\theta_2$ from the first separation angle $\theta_1$, to the anamorphic lens 16. The second separation angle $\theta_2$ is as small as possible to leave sufficient separation of the anamorphic lens 16 from the polygonal mirror 14 to prevent the transmission of oscillations from the rotating polygonal mirror 14 to the anamorphic lens 16.

The curved surface mirror 15 is therefore inclined towards the polygonal mirror to reduce the deflection amount in the general sub-scanning direction. Furthermore, since the laser beam is incident to the polygonal mirror 14 with an inclination causing curvature of the scanning lines, by inclining the curved mirror 15 in the direction opposite that of the polygonal mirror 14, a canceling curvature is generated, and the curvatures are substantially canceled out.

The anamorphic lens has different shapes on its incident and exit sides; that is, the sides on which the scanning beam is incident and on which the beam exits. The incident side of the anamorphic lens 16 is convex, aspherical, and rotationally symmetrical about the optical axis (having no magnification power). The light exit side of the anamorphic lens 16 is concave, and rotationally asymmetrical about the optical axis. The shape of the light exit side is a locus formed from the rotation of a curved, non-arc line about an axis in the main scanning direction. The anamorphic lens has almost no power in the main scanning direction, but has positive power in the sub-scanning direction gradually increasing from the edges (in the main scanning direction) to the center.

As to the sub-scanning direction, the optical axes of both surfaces of the anamorphic lens 16 are offset within the lens body towards the polygonal mirror with respect to the optical axis of the optical system in the sub-scanning direction. By arranging the anamorphic lens 16 to be eccentric, or offset, in the sub-scanning direction, skew distortion, generated as the laser beam is incident on the reflection surfaces of the polygonal mirror 14 at an angle in the sub-scanning direction, is corrected. That is, since the laser beam incident on the anamorphic lens 14 scans in accordance with a locus offset from the revolution axis of the incident surface of the anamorphic lens 16 (coincident with the optical axis of the lens 16), the anamorphic lens 16 bends the laser beam asymmetrically about the optical axis in the sub-scanning direction. With this function, the skew distortion of the laser beam can be corrected. In this embodiment, since the optical axis is offset from the scanning locus, the anamorphic lens 16 is reduced in size in the sub-scanning direction on the side of the optical axis away from the scanning locus, as this portion of the lens 16 is not used. That is, the anamorphic lens 16 is formed to be of substantially equal height in the sub-scanning direction on either side of the incident scanning locus, although the optical axis is displaced toward the polygonal mirror 14 in the same direction.

A flat mirror 40 is placed between the anamorphic lens 16 and the curved surface mirror 15, just out of the scanning range used for printing, and opposing the curved surface mirror 15, at a predetermined position corresponding to the end of the scanning range. When the laser beam reflected by the curved surface mirror 15 reaches the end of the scanning range, the laser beam is reflected by the flat mirror 40 to a light sensor 42, first passing through a cylindrical lens 41 having positive power only in the sub-scanning direction. The light sensor 42 is positioned on the opposite side of the optical scanning device 100, and sends a synchronizing signal to initiate the writing of each main scan in response to each detection of the laser. The laser beam reflected by the curved surface mirror 15 is converged in the main scanning direction, but dispersed in the sub-scanning direction over the longer optical path to the detector 42, so it is reconverged at the lens 41 in the sub-scanning direction to form a spot on the light sensor. 42. In case the laser beam is displaced in the sub-scanning direction, the correction function of the lens 41 leads the laser beam to the light sensor 42.

Figure 2:
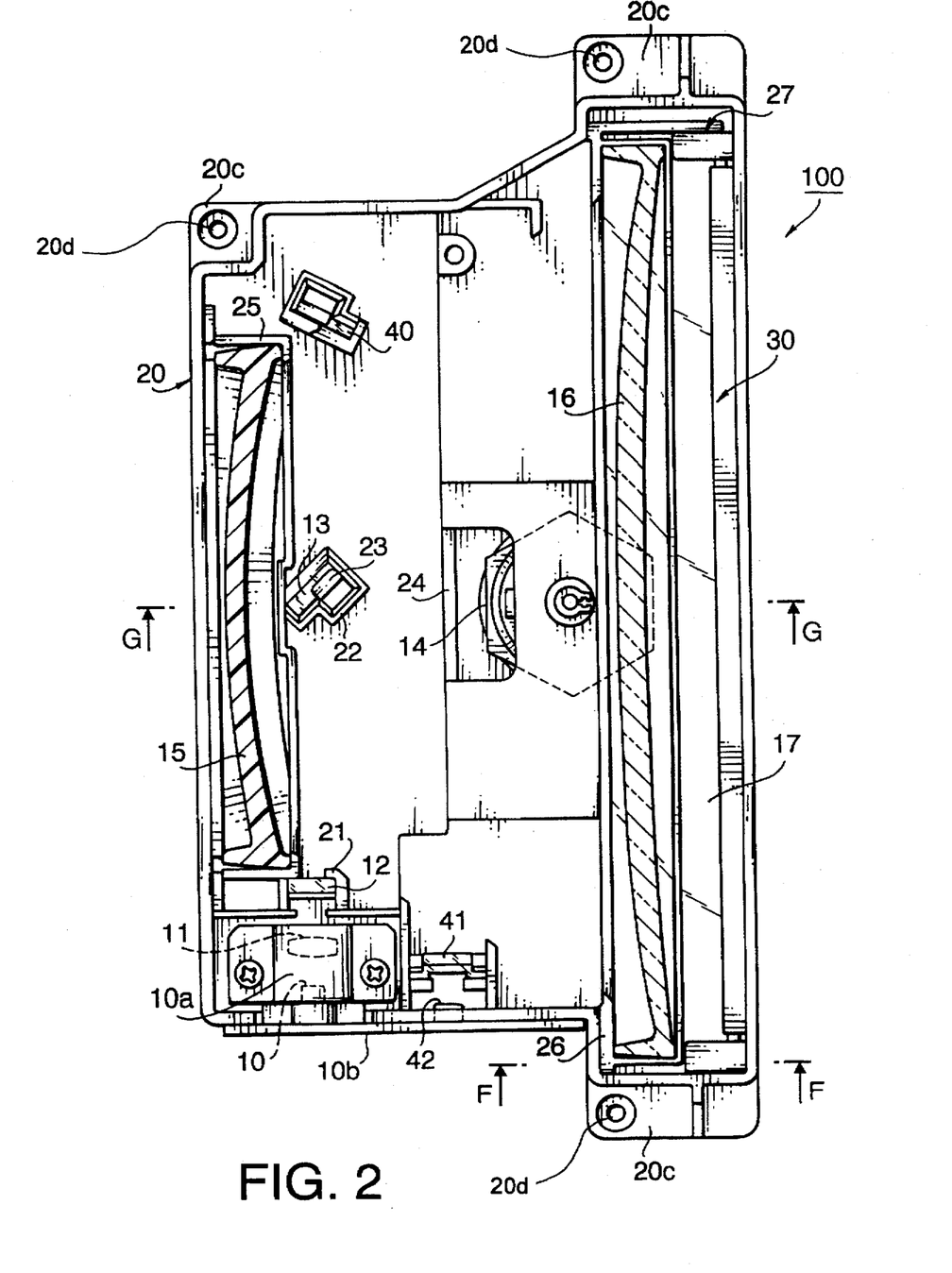
FIG. 2 is a plan view of an optical scanning device as applied in the embodiment of the invention.
Figure 3:
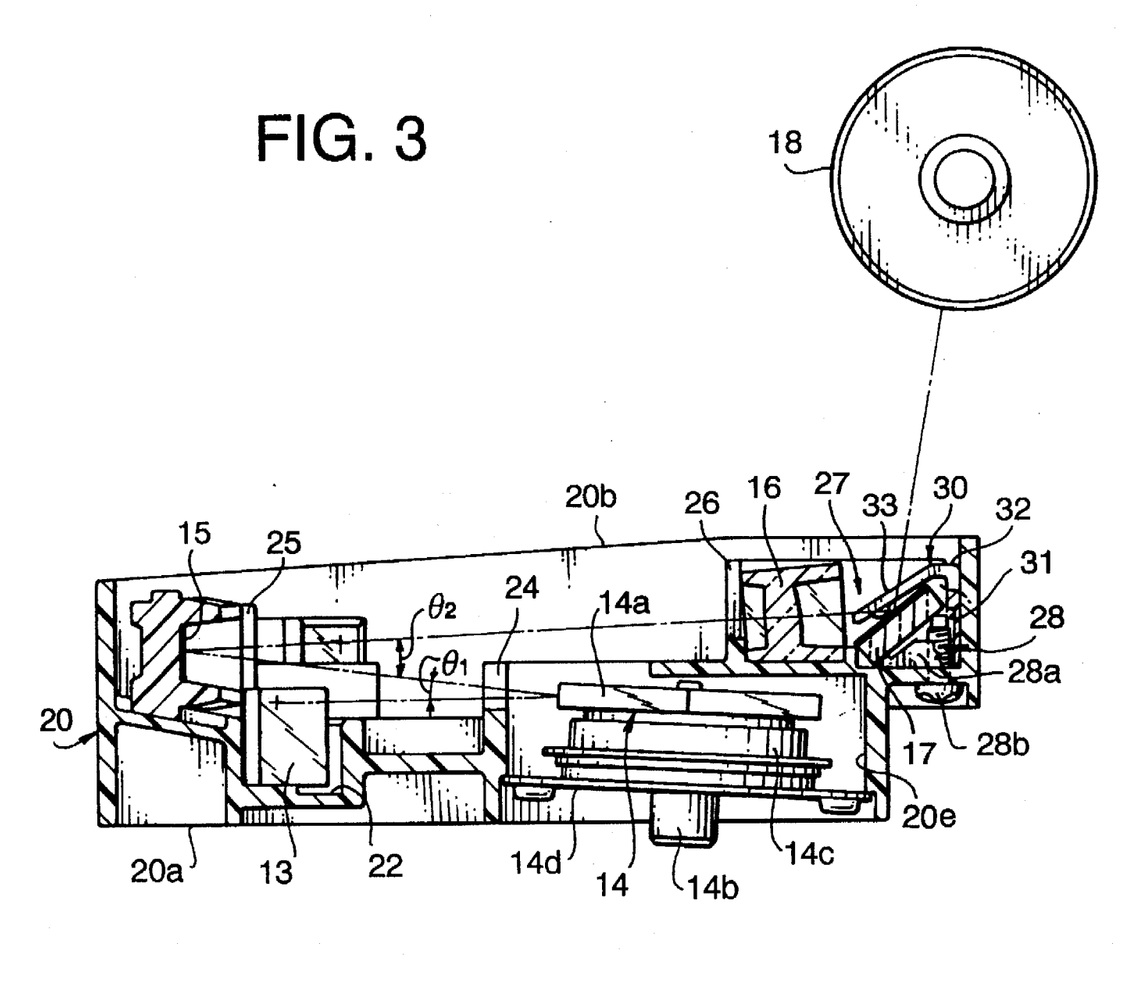
FIG. 3 is a side sectional view of the optical scanning device, taken along the line G—G of FIG. 2.

FIGS. 2 and 3 show an example of actual assembly of the device. Among the above-described optical elements, elements having aspherical surfaces (i.e. the cylindrical lenses 12, 41, the curved surface mirror 15, and the anamorphic lens 16) are formed from resin plastic, and the flat elements (i.e., flat mirrors 13, 40, and the optical path bending mirror 17) are formed by coating a reflective metal layer on one surface of a glass planar element. The front reflective layer of the optical path bending mirror 17 is identified as the front mirror surface, and the opposite surface is identified as the back surface.

A housing 20, formed from plastic resin, holds the optical elements. The housing 20 is formed with reference to a mounting plane; that is, the optical scanning device is mounted in a laser beam printer or other apparatus with reference to the mounting plane, and the size of the housing in a direction normal to the mounting plane defines the thickness of the housing. A direction substantially normal to the mounting plane is the sub-scanning direction in this case. In this embodiment, a mounting surface 20a, and at least three mounting tabs 20c (each having a mounting hole 20d), are all parallel to the mounting plane.

In this embodiment, the flat mirror 13 is secured in the housing at a very small angle, such that the laser supply plane (including the central axis of the laser beam reaching the polygonal mirror 14 from the semiconductor laser 10) is very slightly inclined with respect to the mounting plane. Thus, the laser beam incident on the polygonal mirror 14 is substantially parallel to the bottom surface 20a and the mounting tabs 20c of the housing 20. In the description of relationships between angles, the laser supply plane and mounting plane can be used interchangeably, as the small angle difference does not substantially change the function of the angular relationships between optical elements of the device. The flat mirror 13 and polygonal mirror 14 unit have some size in the sub-scanning direction, and the small angle relationship between the laser supply plane and the mounting plane is permitted by the accommodation of the elements in the housing 20. In this embodiment, for example, the angle between the laser supply plane and the mounting plane is 1 degree, set by inclining the flat mirror by ½ degree.

The semiconductor laser 10 and the collimator 11 are held as a unit within the laser supply plane in a metal subframe 10a, and the subframe 10a is screwed to the housing 20. A circuit board 10b bearing components for driving the semiconductor laser 10 and the light sensor 42 is mounted outside the housing 20 in the vicinity of the subframe 10a. The cylindrical lens 12 is arranged in the laser supply plane such that the cylindrical surface thereof faces the semiconductor laser 10. The cylindrical lens 12 is fixed to the housing 20 with a flat surface side thereof abutting a lens locating portion 21 formed in the housing 20. Another cylindrical lens 41, having positive power in the sub-scanning direction, is secured to the housing 20 in front of the light sensor 42. The flat mirror 13 is held in a mirror mounting portion 22 having two positioning beads for positioning the mirror formed on the back surface thereof. The mirror 13 is secured to the mounting portion 22 by means of a metal leaf spring 23 pressed between the mirror 13 and the mounting portion 22.

The polygonal mirror 14 is mounted to the rotational axis 14b of a scanner motor 14c, and the scanner motor 14c is fixed to a motor base plate 14d. The rotational axis 14b is normal to the base plate 14d, which bears a driving circuit. A cavity in the housing 20 including a base plate mounting surface 20e, inclined from the mounting plane substantially at the aforementioned angle $\theta_1/2$, holds the base plate 14d. The base plate 14d is screwed onto the outer housing 20 from the lower side of FIG. 3. An opening 24 is formed in a side of the cavity in the housing 20, exposing a portion of the polygonal mirror 14 to the interior of the housing 20. The incident laser beam from the flat mirror 13 strikes the polygonal mirror 14 via the opening and the reflected beam directed towards the curved mirror 15 also passes through the opening 24.

Figure 4:
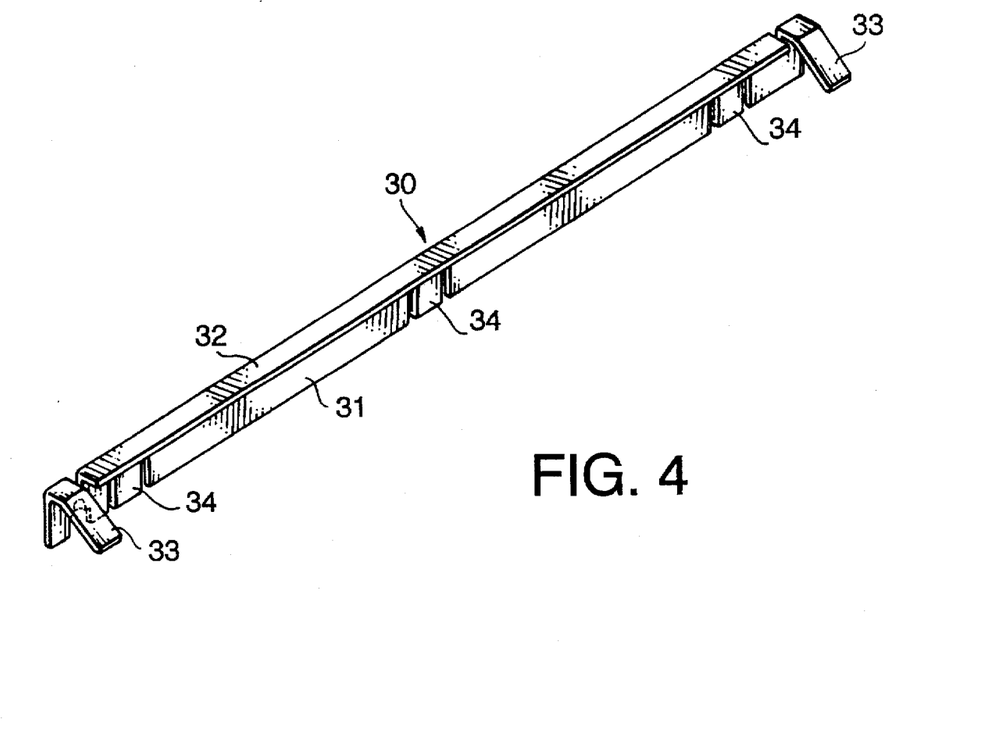
FIG. 4 is a perspective view of an optical path bending mirror fastener according to the embodiment of the invention.

As shown in FIGS. 3 and 4, the optical path bending mirror 17 is secured to a mirror mount 27 of the housing 20 by means of a mirror fastener 30. An adjusting portion 28, for adjusting the angle of the optical path bending mirror 17, is provided on one end side of the mirror mount 27.

The adjusting portion 28 includes a stepped portion 28a integral with the housing 20. An adjusting screw 28b screwed from the lower side of the housing 20, protrudes above the stepped portion 28a to abut the optical path bending mirror 17. By adjusting the screw 28b, the height of the point of the screw changes, pushing up the back surface of the optical path bending mirror 17, and thus the angle of the optical path bending mirror 17 can be minutely adjusted.

Figure 5A:
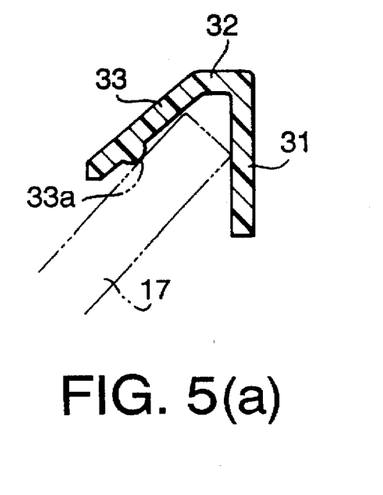
FIG. 5(a) is a side sectional view of the mirror fastener, taken along the line G—G of FIG. 2.

A mirror fastener 30 is insertable to fasten the mirror. The mirror fastener 30 includes a rear wall 31, against which the back surface of the optical path bending mirror 17 rests, and an upper wall 32, forming an L shaped section. Two resilient retaining arm portions 33 are positioned at opposite longitudinal ends in the main scanning direction, for holding the front mirror surface of the optical path bending mirror. The arm portions 33 are formed to have a V shaped section in combination with the rear wall 31 in order to retain the mirror 17. Hemispherical protrusions 33a (see FIG. 5(a)) are formed on the inner surface of each of the arm portions 33 to point contact the mirror 17 front mirror surface.

Figure 5B:
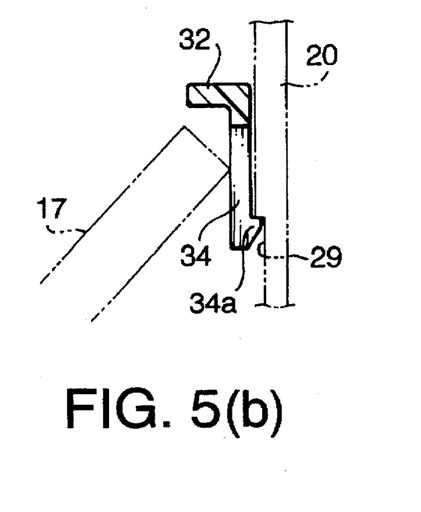
FIG. 5(b) is a side sectional view of the mirror fastener, taken along the line F—F of FIG. 2.

Three engaging portions 34 for fastening the mirror fastener 30 to the housing 20 are formed along the rear wall 31. The three engaging portions 34 are generally coplanar with the rear wall 31, and are swingable or deformable with respect to the rear wall 31. As illustrated in FIG. 5(b), a hook 34a is formed on each of the engaging portions, extending in the direction of the facing wall of the housing 20, for engaging respective slots 29 formed at the facing wall of the mirror mounting portion 27 of the housing 20. The slots 29 and hooks 34a retain the fastener 30 and mirror 17 to the housing 20.

During assembly, the optical path bending mirror 17 is set in the mirror mounting portion 27 abutting stepped portions 28a. Thereafter, the mirror fastener 30 is press-inserted from the upper side behind the mirror 17 so that the back surface of the mirror 17 abuts the rear wall 31. The fastener is set to engage the hooks 34a to the slots 29 of the housing 20. The mirror 17 is thereby secured to the housing 20, and held rigidly at the bottom by the mounting portion 27 and stepped portions 28a, at the back surface by the rear wall 31 and resiliently from the front mirror surface by the arm portions 33.

An advantage of the embodiment lies in the arrangement and interaction between the optical elements, in relation to the final possible reduction in size of the housing 20 in the sub-scanning direction.

Figure 6A:
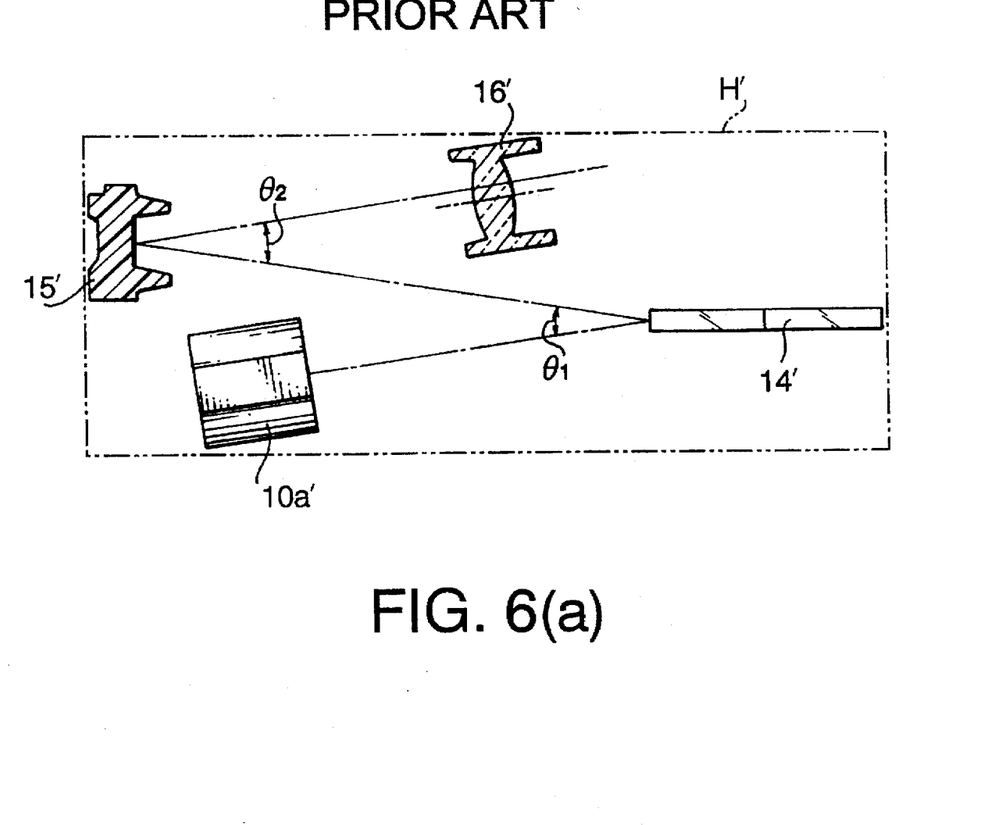
FIG. 6(a) is a side schematic view of optical paths of a known optical system.

Particularly, by inclining the polygonal mirror 14 upwardly with reference to the curved surface mirror 15, the angle $\theta_1$ can be reduced, and the housing 20 thereby reduced in height, below the polygonal mirror 14, in the general sub-scanning direction. FIG. 6(a) shows a configuration of elements similar to the prior art. In FIG. 6(a), an uninclined polygonal mirror 14', a metal subframe 10a' housing a laser source and collimator, an uninclined curved surface mirror 15', and a toric lens 16' are arranged to form an optical system. The possible size of the housing is shown by the double-dotted line H'.

Figure 6B:
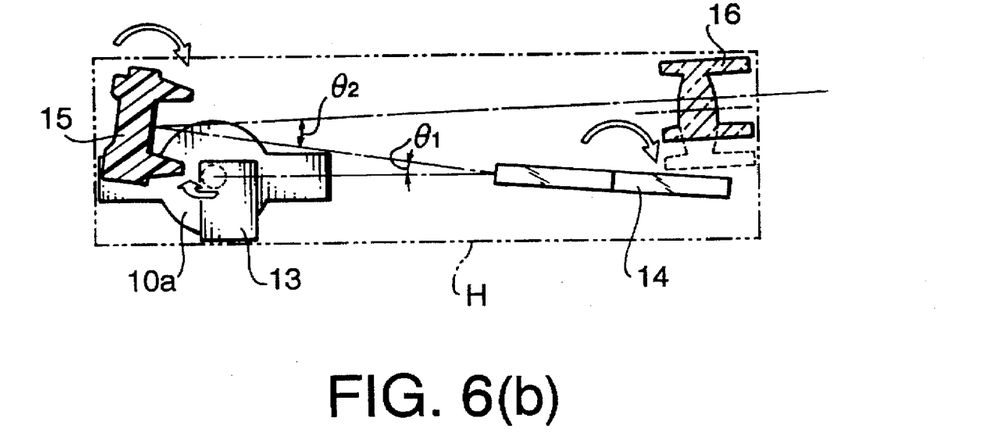
FIG. 6(b) is a side schematic view of optical paths according to the embodiment.

FIG. 6(b) shows a schematic arrangement of some of the elements of the embodiment shown in FIG. 3, with the possible size of a housing denoted by the line H. In FIG. 6(b), the inclination of the polygonal mirror 14 by $\theta_1/2$ changes the necessary optical path such that the reference plane, containing the metal subframe 10a (including the laser 10 and collimator 11) and the flat mirror 13, may be swung to be substantially parallel with the mounting plane. In this case, the reference plane may only be swung up to a position where the flat mirror 13 does not interfere with the path from the polygonal mirror 14 to the curved surface mirror 15.

Similarly, by inclining the curved surface mirror 15 with respect to the polygonal mirror 14, the angle $\theta_2$ can be reduced, and the housing 20 thereby reduced in height, above the polygonal mirror 14, in the general sub-scanning direction. That is, as shown in FIG. 6(b), the inclination of the curved surface mirror 15 changes the necessary optical path such that the anamorphic lens 16 may be swung down. In this case, the anamorphic lens 16 may only be swung down to a position where the turbulence and other vibration generated by the rotating polygonal mirror 14 does not affect the optical performance of the anamorphic lens 16.

In this case, as the optical axis of the anamorphic lens 16 is offset toward the polygonal mirror 14 to remove skew distortion, the anamorphic lens is reduced in size in the sub-scanning direction. The removed portion is shown in FIG. 6(b) by a single dotted line. Thus, the anamorphic lens 16 may be placed more closely to the polygonal mirror 14, and the possible housing H my be further reduced in the sub-scanning direction.

Further, by bending the optical path from the laser 10 to the polygonal mirror 14 at a right angle parallel to the mounting plane using a flat mirror 13, the swinging up of the reference plane may be increased, as the bulky metal subframe 10a supplies the laser beam from the side of the system, and does not interfere in any optical paths.

It can be seen that the more the angles $\theta_1$ and $\theta_2$ are reduced, the closer the height of the necessary housing in the sub-scanning direction approaches a minimum thickness. This reduction is limited, as described, by the constraints of avoiding interference between the respective optical elements, and between the optical elements and the optical paths, and of avoiding vibration generated by the polygonal mirror.

The present disclosure relates to subject matter contained in Japanese Patent Application No. HEI 06-287385, filed on Oct. 27, 1994, which is expressly incorporated herein by reference in its entirety.

What is claimed is:

1. An optical scanning device comprising:

a housing having a flat mounting surface for mounting the optical scanning device, said flat mounting surface defining a mounting plane;

a laser source, supported by said housing, for supplying a laser flux;

a polygonal mirror for scanning said laser flux supplied by said laser source, said polygonal mirror being rotatably supported in said housing about a rotary axis inclined with respect to said flat mounting surface by a predetermined angle, said predetermined angle defining an incident optical path substantially parallel to said mounting surface along which said laser flux is supplied by said laser source and a scanning optical path for separating said scanning laser flux by a first separation angle $\theta_1$ in a sub-scanning direction away from said mounting plane;

a first flat mirror for directing said laser flux from said laser source to said polygonal mirror;

a curved surface mirror for reflecting said laser flux scanned by said polygonal mirror, and for converging said laser flux scanned by said polygonal mirror in a main scanning direction, said reflected scanning laser flux being separated from said scanning laser flux by a second separation angle $\theta_2$ in said sub-scanning direction; and an anamorphic lens for converging said reflected scanning laser flux in said sub-scanning direction, at least a portion of said laser source being positioned in a same plane in said main scanning direction as said curved surface mirror while not interfering with said curved surface mirror, and at least a portion of said first flat mirror being positioned adjacent said curved mirror.

2. The optical scanning device according to claim 1, wherein said laser source emits a laser beam substantially parallel to said mounting surface, said laser source being positioned between said curved mirror and said polygonal mirror, and wherein said first flat mirror is supported by said housing and receives and redirects said laser beam from said laser source in a direction substantially parallel to said mounting surface.

3. The optical scanning device according to claim 2, wherein said first flat mirror is secured to said housing inclined by an angle of less than or equal to one degree with respect to a normal of said mounting plane.

4. The optical scanning device according to claim 2, wherein said housing further comprises a mirror mounting portion having two positioning beads formed on a back surface of said mirror mounting portion; and wherein said first flat mirror is held in said mirror mounting portion against said two positioning beads.

5. The optical scanning device according to claim 2, further comprising:

a light sensor, provided beside said laser source, for initiating a main scan; and a second flat mirror positioned between said curved surface mirror and said anamorphic lens and opposing said curved mirror, for reflecting said scanning beam to said light sensor at the end of a scanning range of said scanning beam.

6. The optical scanning device according to claim 5, wherein said laser source comprises a semiconductor laser and a collimator, said semiconductor laser and said collimator being mounted on a circuit board bearing circuits for driving said laser, said circuit board being mounted outside said housing.

7. The optical scanning device according to claim 6, wherein said light sensor is mounted on said circuit board.

8. The optical scanning device according to claim 1, wherein said first separation angle $\theta_1$ defines a minimum distance in said sub-scanning direction between said first flat mirror and said curved surface mirror sufficient to prevent interference with said scanning beam path; and wherein said second separation angle $\theta_2$ defines a minimum distance in said sub-scanning direction between said polygonal mirror and said anamorphic lens sufficient to prevent transmission of vibration from said polygonal mirror to said anamorphic lens.

9. The optical scanning device according to claim 1, further comprising:

an optical path bending mirror, for reflecting the converged beam having been sent by said anamorphic lens toward a scanning subject surface.

10. The optical scanning device according to claim 1, wherein said housing is provided with a plurality of mounting tabs having surfaces parallel to said mounting plane.

11. The optical scanning device according to claim 1, wherein each of a plurality of reflection surfaces of said polygonal mirror is formed to be parallel with said rotary axis.

12. The optical scanning device according to claim 1, wherein a cavity formed in said housing includes a base plate mounting surface inclined from said mounting plane by half of said first separation angle $\theta_1$, and wherein said polygonal mirror is mounted to a scanner motor unit having a flat base plate, and said flat base plate is held by said base plate mounting surface of the cavity.

13. The optical scanning device according to claim 12, wherein an opening is formed in a side of said cavity formed in said housing, exposing a portion of said polygonal mirror to the interior of said housing, and wherein both of said incident and said scanning optical paths pass through said opening.

14. The optical scanning device according to claim 1, wherein said anamorphic lens is formed to be of substantially equal height in said sub-scanning direction on either side of a scanning locus of said reflected scanning laser flux on said anamorphic lens, and wherein an optical axis of said anamorphic lens is displaced in said sub-scanning direction toward said polygonal mirror.

15. An optical scanning device comprising:

a housing having a flat mounting surface for mounting the optical scanning device, said flat mounting surface defining a mounting plane;

a laser supply, supported by said housing, for supplying a laser flux;

a polygonal mirror for scanning said laser flux supplied by said laser supply, said polygonal mirror being rotatably supported in said housing about a rotary axis inclined with respect to said flat mounting surface by a predetermined angle, said predetermined angle defining an incident optical path substantially parallel to said mounting surface along which said laser flux is supplied by said laser supply and a scanning optical path for separating said scanning laser flux by a first separation angle $\theta_1$ in a sub-scanning direction away from said mounting plane;

a curved surface mirror for reflecting said laser flux scanned by said polygonal mirror, and for converging said laser flux scanned by said polygonal mirror in a main scanning direction, said reflected scanning laser flux being separated from said scanning laser flux by a second separation angle $\theta_2$ in said sub-scanning direction; and an anamorphic lens for converging said reflected scanning laser flux in said sub-scanning direction, wherein said laser supply comprises:

a laser source supported by said housing, for emitting a laser beam substantially parallel to said mounting surface, and being positioned between said curved mirror and said polygonal mirror; and a first flat mirror supported by said housing, for receiving and redirecting said laser beam from said laser source in a direction substantially parallel to said mounting surface, wherein said first flat mirror is secured to said housing inclined by an angle of less than or equal to one degree with respect to a normal of said mounting plane.

16. An optical scanning device comprising:

a housing having a flat mounting surface for mounting the optical scanning device, said flat mounting surface defining a mounting plane;

a laser supply, supported by said housing, for supplying a laser flux, said laser supply comprising a laser source for emitting a laser beam substantially parallel to said mounting surface, and a first flat mirror for receiving and redirecting said laser beam from said laser source in a direction substantially parallel to said mounting surface, said laser source and said first flat mirror being supported by said housing;

a light sensor, provided beside said laser source, for initiating a main scan;

a polygonal mirror for scanning said laser flux supplied by said laser supply, said polygonal mirror being rotatably supported in said housing about a rotary axis inclined with respect to said flat mounting surface by a predetermined angle, said predetermined angle defining an incident optical path substantially parallel to said mounting surface along which said laser flux is supplied by said laser supply and a scanning optical path for separating said scanning laser flux by a first separation angle $\theta_1$ in said sub-scanning direction;

a curved surface mirror for reflecting said laser flux scanned by said polygonal mirror, and for converging said laser flux scanned by said polygonal mirror in a main scanning direction, said reflected scanned laser flux being separated from said scanning laser flux by a second separation angle $\theta_2$ in said sub-scanning direction, and said laser source being positioned between said curved surface mirror and said polygonal mirror;

an anamorphic lens for converging said reflected scanning laser flux in said sub-scanning direction; and a second flat mirror positioned between said curved surface mirror and said anamorphic lens, and opposing said curved surface mirror, for reflecting said scanning beam to said light sensor at the end of a scanning range of said scanning beam.

17. The optical scanning system according to claim 16, wherein said laser source comprises a semiconductor laser and a collimator, said semiconductor laser and said collimator being mounted on a circuit board bearing circuits for driving said laser, said circuit board being mounted outside said housing.

18. The optical scanning device according to claim 17, wherein said light sensor is mounted on said circuit board.

19. An optical scanning device comprising:

a housing having a flat mounting surface for mounting the optical scanning device, said flat mounting surface defining a mounting plane;

a laser supply, supported by said housing, for supplying a laser flux;

a polygonal mirror for scanning said laser flux supplied by said laser supply, said polygonal mirror being rotatably supported in said housing about a rotary axis inclined with respect to said flat mounting surface by a predetermined angle, said predetermined angle defining an incident optical path substantially parallel to said mounting surface along which said laser flux is supplied by said laser supply and a scanning optical path for separating said scanning laser flux by a first separation angle $\theta_1$ in a sub-scanning direction away from said mounting plane;

a curved surface mirror for reflecting said laser flux scanned by said polygonal mirror, and for converging said laser flux scanned by said polygonal mirror in a main scanning direction, said reflected scanning laser flux being separated from said scanning laser flux by a second separation angle $\theta_2$ in said sub-scanning direction; and an anamorphic lens for converging said reflected scanning laser flux in said sub-scanning direction, wherein an opening is formed in a side of a cavity formed in said housing, exposing a portion of said polygonal mirror to the interior of said housing, and wherein both of said incident and said scanning optical paths pass through said opening.

20. An optical scanning device comprising:

a housing having a flat mounting surface for mounting the optical scanning device, said flat mounting surface defining a mounting plane;

a laser source, supported by said housing, for supplying a laser flux;

a polygonal mirror for scanning said laser flux supplied by said laser source, said polygonal mirror being rotatably supported in said housing about a rotary axis inclined with respect to said flat mounting surface by a predetermined angle, said predetermined angle defining an incident optical path substantially parallel to said mounting surface along which said laser flux is supplied by said laser source and a scanning optical path for separating said scanning laser flux by a first separation angle $\theta_1$ in a sub-scanning direction away from said mounting plane;

a first flat mirror for directing said laser flux from said laser source to said polygonal mirror;

a curved surface mirror for reflecting said laser flux scanned by said polygonal mirror, and for converging said laser flux scanned by said polygonal mirror in a main scanning direction, said reflected scanning laser flux being separated from said scanning laser flux by a second separation angle $\theta_2$ in said sub-scanning direction; and an anamorphic lens for converging said reflected scanning laser flux in said sub-scanning direction, said laser source and said curved mirror being separated in said main scanning direction but overlapped in said sub-scanning direction, and said first flat mirror and said curved mirror being separated in said sub-scanning direction but overlapped in said main scanning direction.

* * * * *